(12) United States Patent
Lubbehusen et al.

(10) Patent No.: US 11,757,958 B1
(45) Date of Patent: *Sep. 12, 2023

(54) SYSTEMS AND METHODS FOR SECURE, CONTROLLED VIRTUAL VISITATION WITH CONFINEMENT INSTITUTION INMATES

(71) Applicant: CONFINEMENT TELEPHONY TECHNOLOGY, LLC, Greensboro, NC (US)

(72) Inventors: Rick Allen Lubbehusen, Winston Salem, NC (US); John Vincent Townsend, III, Kernersville, NC (US); Edward Eugene Williams, Sr., Thomasville, NC (US); Eugene Bernard Joswick, III, Marietta, GA (US)

(73) Assignee: Confinement Telephony Technology, LLC, Greensboro, NC (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/523,392

(22) Filed: Nov. 10, 2021

Related U.S. Application Data

(63) Continuation-in-part of application No. 16/383,743, filed on Apr. 15, 2019, now Pat. No. 11,201,899.
(Continued)

(51) Int. Cl.
*H04L 65/4038* (2022.01)
*H04L 65/1069* (2022.01)
(Continued)

(52) U.S. Cl.
CPC ......... *H04L 65/4038* (2013.01); *H04L 43/10* (2013.01); *H04L 65/1069* (2013.01); *H04L 65/1083* (2013.01); *H04L 65/403* (2013.01); *H04L 67/02* (2013.01); *H04L 67/12* (2013.01); *H04L 67/125* (2013.01); *H04L 67/14* (2013.01); *H04L 67/60* (2022.05)

(58) Field of Classification Search
CPC . H04L 65/4038; H04L 65/1083; H04L 67/02; H04L 67/125; H04L 67/14
See application file for complete search history.

(56) References Cited

U.S. PATENT DOCUMENTS 6,137,486 A * 10/2000 Yoshida ................. H04N 21/47
725/28
7,325,196 B1   1/2008 Covington
(Continued)

*Primary Examiner* — Jimmy H Tran
(74) *Attorney, Agent, or Firm* — Thompson Hine LLP

(57) ABSTRACT

Secure, controlled, interactive virtual visitation for confinement institution inmates is provided using computing devices connected through a network by managing the scheduling of visitation sessions and use of shared visitation session resources, ensuring the identities of the inmate and the person with whom the inmate is to interact in the virtual visitation session, and by monitoring the interactions and communications during the virtual visitation sessions to detect prohibited activities. Another embodiment of the invention uses a virtual desktop shared from a remote server to ensure that an inmate does not have access to prohibited applications or content during a virtual visitation session.

11 Claims, 9 Drawing Sheets

Related U.S. Application Data which is a continuation of application No. 15/956,877, filed on Apr. 19, 2018, now abandoned, which is a continuation of application No. 15/625,666, filed on Jun. 16, 2017, now Pat. No. 9,979,760, which is a continuation of application No. 15/162,058, filed on May 23, 2016, now Pat. No. 9,723,040.

(60) Provisional application No. 62/213,459, filed on Sep. 2, 2015.

(51) Int. Cl.
| | |
|---|---|
| *H04L 67/02* | (2022.01) |
| *H04L 65/403* | (2022.01) |
| *H04L 67/125* | (2022.01) |
| *H04L 65/1083* | (2022.01) |
| *H04L 67/12* | (2022.01) |
| *H04L 67/14* | (2022.01) |
| *H04L 43/10* | (2022.01) |
| *H04L 67/60* | (2022.01) |

(56) References Cited

U.S. PATENT DOCUMENTS

| | | | |
|---|---|---|---|
| 7,590,630 B2 | 9/2009 | Richter | |
| 8,620,711 B2 | 12/2013 | Tor | |
| 9,007,420 B1 | 4/2015 | Passe | |
| 9,055,167 B1 | 6/2015 | Keiser | |
| 9,083,850 B1 | 7/2015 | Higgs | |
| 9,106,789 B1 | 8/2015 | Shipman | |
| 9,924,135 B1 | 3/2018 | Smith | |
| 10,049,543 B1 | 8/2018 | Passe | |
| 10,375,059 B1* | 8/2019 | Fieldman | G09B 5/02 |
| 10,713,743 B1 | 7/2020 | Smith | |
| 10,904,067 B1 | 1/2021 | Higgs | |
| 2002/0118808 A1 | 8/2002 | Kelleher | |
| 2003/0004752 A1 | 1/2003 | Banerjee | |
| 2003/0046108 A1 | 3/2003 | Labadie | |
| 2003/0164850 A1 | 9/2003 | Rojewski | |
| 2005/0257045 A1* | 11/2005 | Bushman | H04L 63/12 |
| | | | 713/156 |
| 2006/0127870 A1 | 6/2006 | Fields | |
| 2007/0159343 A1 | 7/2007 | Crucilla | |
| 2007/0271220 A1 | 11/2007 | Carter | |
| 2008/0168543 A1 | 7/2008 | von Krogh | |
| 2008/0201158 A1 | 8/2008 | Johnson | |
| 2008/0209045 A1 | 8/2008 | Rothstein | |
| 2008/0229215 A1* | 9/2008 | Baron | G06N 3/006 |
| | | | 715/751 |
| 2009/0049077 A1 | 2/2009 | Lawlor | |
| 2009/0181354 A1 | 7/2009 | Dasgupta | |
| 2010/0112540 A1 | 5/2010 | Gross | |
| 2010/0128104 A1 | 5/2010 | Fabregat | |
| 2010/0250755 A1 | 9/2010 | Morris | |
| 2011/0205331 A1 | 8/2011 | Kato | |
| 2011/0314094 A1* | 12/2011 | De Oliveira Antunes | |
| | | | G09B 5/14 |
| | | | 709/203 |
| 2012/0202465 A1* | 8/2012 | Angel | H04M 3/42221 |
| | | | 455/412.1 |
| 2012/0233205 A1 | 9/2012 | McDermott | |
| 2012/0281058 A1 | 11/2012 | Laney | |
| 2012/0311499 A1 | 12/2012 | Dellinger | |
| 2012/0330857 A1 | 12/2012 | Young | |
| 2013/0151620 A1 | 6/2013 | Deshpande | |
| 2013/0194377 A1 | 8/2013 | Humphries | |
| 2013/0238708 A1* | 9/2013 | Bustamente | H04L 63/0421 |
| | | | 709/204 |
| 2013/0263227 A1 | 10/2013 | Gongaware | |
| 2013/0282421 A1 | 10/2013 | Graff | |
| 2013/0326330 A1 | 12/2013 | Harris | |
| 2014/0082611 A1 | 3/2014 | Li | |
| 2014/0173463 A1 | 6/2014 | Mitchell | |
| 2014/0218466 A1 | 8/2014 | Bloms | |
| 2014/0267540 A1 | 9/2014 | Torgersrud | |
| 2014/0272882 A1* | 9/2014 | Kaufman | G09B 5/065 |
| | | | 434/308 |
| 2014/0280559 A1 | 9/2014 | Torgersrud | |
| 2014/0280631 A1 | 9/2014 | Torgersrud | |
| 2014/0313275 A1 | 10/2014 | Gupta | |
| 2015/0039688 A1 | 2/2015 | Huang | |
| 2015/0098631 A1 | 4/2015 | Palmer | |
| 2015/0163067 A1 | 6/2015 | Cudak | |
| 2015/0188925 A1 | 7/2015 | Gupta | |
| 2015/0213304 A1 | 7/2015 | Passe | |
| 2015/0215254 A1 | 7/2015 | Bennett | |
| 2015/0221056 A1 | 8/2015 | Jones | |
| 2015/0222745 A1 | 8/2015 | Kiet | |
| 2015/0271013 A1 | 9/2015 | Singh | |
| 2015/0358589 A1 | 12/2015 | Passe | |
| 2016/0066182 A1 | 3/2016 | Hodge | |
| 2016/0072853 A1* | 3/2016 | Belief | H04L 65/764 |
| | | | 709/204 |
| 2016/0125343 A1 | 5/2016 | O'Dea | |
| 2016/0191484 A1 | 6/2016 | Gongaware | |
| 2016/0191849 A1 | 6/2016 | Humphries | |
| 2016/0249016 A1 | 8/2016 | Zino | |
| 2016/0301896 A1 | 10/2016 | Keiser | |
| 2016/0313880 A1 | 10/2016 | Godewyn | |
| 2017/0142076 A1* | 5/2017 | Ford | H04L 63/061 |
| 2017/0264448 A1 | 9/2017 | Keiser | |
| 2017/0264753 A1 | 9/2017 | Rae | |
| 2017/0302885 A1 | 10/2017 | Edwards | |
| 2017/0325096 A1 | 11/2017 | Torgersrud | |
| 2019/0089829 A1* | 3/2019 | Nicholls | H04L 67/535 |
| 2019/0147141 A9* | 5/2019 | Kahn | G16H 40/67 |
| | | | 705/3 |
| 2019/0156689 A1 | 5/2019 | Jaeh | |
| 2019/0180253 A1 | 6/2019 | Conrad | |
| 2019/0222560 A1 | 7/2019 | Ford | |
| 2019/0266877 A1 | 8/2019 | Keyton | |
| 2019/0354552 A1* | 11/2019 | Maharajh | H04L 67/10 |
| 2020/0014790 A1 | 1/2020 | Day, II | |
| 2020/0053099 A1 | 2/2020 | Day, II | |
| 2020/0077046 A1 | 3/2020 | Humphries | |
| 2020/0204527 A1* | 6/2020 | Vass | G06Q 10/107 |
| 2020/0296320 A1* | 9/2020 | Hoye | G01C 21/32 |
| 2021/0149911 A1* | 5/2021 | Olligschlaeger | G10L 15/26 |
| 2021/0396046 A1* | 12/2021 | Johnson | E05B 47/026 |
| 2022/0182699 A1* | 6/2022 | Gordon | H04N 21/64322 |
| 2022/0245288 A1* | 8/2022 | Anderson | G06F 21/62 |
| 2022/0261853 A1* | 8/2022 | Publicover | G06F 16/2358 |
| 2022/0286644 A1* | 9/2022 | Zhou | H04L 65/1069 |
| 2022/0301668 A1* | 9/2022 | Ullrich | H04L 67/52 |
| 2022/0342993 A1* | 10/2022 | Shear | G06F 21/31 |
| 2022/0391096 A1* | 12/2022 | Tan | H04L 63/0823 |
| 2022/0392360 A1* | 12/2022 | Jaeh | G09B 5/00 |

* cited by examiner

SYSTEMS AND METHODS FOR SECURE, CONTROLLED VIRTUAL VISITATION WITH CONFINEMENT INSTITUTION INMATES

RELATED APPLICATIONS

This application is a continuation-in-part of U.S. patent application Ser. No. 16/383,743 filed on Apr. 15, 2019, entitled "Systems and Methods for Secure, Controlled Virtual Visitation with Confinement Institution Inmates, which is a continuation of U.S. patent application Ser. No. 15/956,877 filed on Apr. 19, 2018, entitled "Systems and Methods for Secure, Controlled Virtual Visitation with Confinement Institution Inmates, which is a continuation of U.S. patent application Ser. No. 15/625,666 filed on Jun. 16, 2017 entitled, "Systems and Methods for Secure, Controlled Virtual Visitation with Confinement Institution Inmates," now U.S. Pat. No. 9,979,760 issued May 22, 2018, which is a continuation of U.S. patent application Ser. No. 15/162,058 filed on May 23, 2016, entitled "Systems and Methods for Secure, Controlled Virtual Visitation with Confinement Institution Inmates," now U.S. Pat. No. 9,723,040 issued Aug. 1, 2017, and which claims the benefit of U.S. Provisional Application No. 62/213,459 filed on Sep. 2, 2015, entitled "Systems and Methods for Secure, Controlled Virtual Visitation with Confinement Institution Inmates," each of which is incorporated herein by reference.

FIELD OF THE INVENTION

This disclosure relates generally to electronic communications, devices, and systems used by inmates and others associated with a controlled access residential institution such as a prison or jail.

BACKGROUND

Prisoners and inmates in confinement facilities and other institutions have limited access to communicate with and interact with people outside of the institution. Such inmates can use tightly controlled phone systems to call loved ones and friends outside of the institution and can receive visitors in person. These outlets of communication and interaction fail to allow sufficient interaction to support contacts that the correctional system may want to encourage, or at least not discourage. For example, it is desirable to encourage imprisoned parents to stay in contact with their children. Encouraging such content may help prevent the parent relationship from irreconcilably deteriorating while the parent is in prison. However, it is often difficult or infeasible for an inmate to help a child with homework over the phone. In person visitation, on the other hand, allows better face-to-face interaction, but is often severely restricted in frequency and duration and far less convenient as it requires the family member to travel, and in many cases someone old enough to drive the family member, to the institution.

Businesses and recreational users use virtual meeting and virtual collaboration software to share computing device screen content with one another, interaction on virtual white boards, and otherwise collaborate during online meetings. These business/personal use-oriented virtual meeting systems, however, fail to provide adequate scheduling, control, or the level of security and monitoring that is needed in the context of prisoners and other inmates in confinement facilities. As examples, it is often desirable to ensure that an inmate who committed a crime against another individual is not able to threaten or otherwise contact the victim of that crime while in prison, to ensure that an inmate with a vendetta against a law enforcement officer, judge, or other individual is not able to threaten that person or plot revenge by contacting hit men or other persons outside of the facility, and to ensure that inmates do not plan escape or other illegal activities by contacting persons outside of the institution. Allowing inmates to use business/personal use-oriented virtual meeting systems could make it possible for the inmates to accomplish these and other types of prohibited communications without detection.

SUMMARY

Secure, controlled, interactive virtual visitation for confinement institution inmates is provided using computing devices connected through a network by managing the scheduling of visitation sessions and use of shared visitation session resources, ensuring the identities of the inmate and the person with whom the inmate is to interact in the virtual visitation session, and by monitoring the interactions and communications during the virtual visitation sessions to detect prohibited activities.

One embodiment of the invention monitors a virtual visitation session between an inmate of a controlled-access residential institution and a non-inmate of the institution by monitoring input on a device of the inmate and/or on a device of a non-inmate and monitoring applications in use on the devices during the virtual visitation session. A forbidden action is detected based on monitoring the input or the applications in use and the virtual visitation session is suspended, ended, or otherwise controlled based on the detected forbidden action.

Another embodiment of the invention provides a controlled virtual visitation session between an inmate of a controlled-access residential institution and a non-inmate of the institution. This embodiment initiates a virtual desktop on a server remote from a device of the inmate and a device of the non-inmate. The virtual desktop provides a limited set of applications, for example, without providing e-mail or Internet browser applications. The embodiment provides an image of the virtual desktop to the device of the inmate and the device of the non-inmate. The embodiment provides the virtual visitation session by iteratively receiving input from the device of the inmate or the device of the non-inmate relative to the image of the virtual desktop, changing the virtual desktop based on the received input, and providing a changed image of the changed virtual desktop to the first device of the inmate and the second device of the non-inmate. In this way, both the inmate and non-inmate can view and collaborate on documents and other content without giving the inmate access to applications on the non-inmate's device.

Another embodiment of the invention schedules a virtual visitation session between an inmate of a controlled-access residential institution and a non-inmate of the institution. The embodiment receives a request to schedule the virtual visitation session, identifies a shared resource (e.g., tablet, private room, etc.) required for the virtual visitation session, schedules a time for the virtual visitation session based on time constraints associated with the shared resource, and notifies the inmate and non-inmate of the time scheduled for the virtual visitation session.

DETAILED DESCRIPTION

Figure 1:
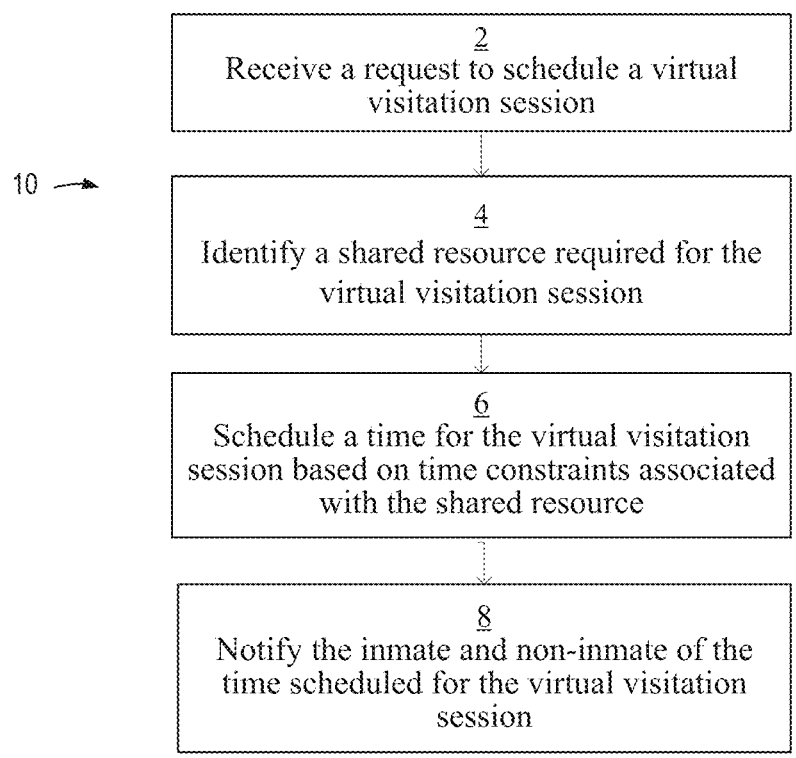
FIG. 1 is a flow chart illustrating an exemplary technique for scheduling inmate visitation sessions.

Secure, controlled, interactive virtual visitation for confinement institution inmates is provided using computing devices connected through a network by managing the scheduling of visitation sessions and use of shared visitation session resources, ensuring the identities of the inmate and the person with whom the inmate is to interact in the virtual visitation session, and by monitoring the interactions and communications during the virtual visitation sessions to detect prohibited activities.

A. Scheduling

The availability of inmates of an institution to participate in virtual visitation sessions is limited by the inmate's personal obligations, restrictions, punishments, rewards, and other time constraints (e.g., the inmate may have scheduled medical appointments, etc.), as well as by the institution's more general time constraints (e.g., all inmates may eat dinner at a specified time, etc.). In addition, if virtual visitation sessions are performed using shared electronic devices, such as computers or tablets used by multiple inmates, the use of those devices must be accounted for in scheduling the virtual visitation sessions. Further, a virtual visitation session may involve shared space, such as designated a private area to be used by different inmates at different times for virtual visitation sessions.

A computerized system is used to track inmate time constraints, institution time constraints, computer and space resource constraints, and other relevant information, and manage the scheduling, changing, and cancellation of virtual visitation sessions. In one embodiment, a scheduling module provides an interface for an inmate or non-inmate to request a time or time window for a virtual visitation session. The scheduling module then schedules the virtual visitation session (or suggests an alternative time) based on the inmate, institution, and resource constraints, and ensures that the visitation session does not violate the constraints. In one embodiment, an inmate's personal schedule specifies the days/times the inmate is allowed to use a computing device and/or conduct a virtual visitation session. The inmate's schedule may vary over time. For example, if the inmate is being punished for a given period of time, the inmate may be restricted from using the device during that time and thus unavailable for virtual visitations. If a visitation is already scheduled during the punishment period, the system sends an automatic notification to the non-inmate identifying that the visitation session has been cancelled or rescheduled. On the other hand, if the inmate is being rewarded for something good (e.g., good behavior, service, etc.), the inmate may get additional free time on his schedule to use in a virtual visitation session.

The management of virtual visitation sessions, in one embodiment, groups inmates into groups to facilitate fair and easier scheduling. For example, in one embodiment of the invention, specific group of inmates are designated to use shared devices at specific time(s)/date(s), e.g., group A has Monday, Wednesday, and Friday, and group B has Tuesday, Thursday, and Saturday, etc.

The scheduling system can also account for various scheduling rules or priorities. For example, inmates being rewarded for good behavior may be given access to times, devices, and private accommodations that other inmates are not given. In another example, the system implements rules to ensure that inmates are not able to monopolize virtual visitation resources using force, intimidation, or resource hoarding techniques. In one example, inmates who have not used the virtual visitation session within a certain time frame (e.g., a week, two weeks, etc.) are given access to times, devices, and private accommodations that other inmates are not given. In another embodiment, an inmate is only allowed to schedule a certain number of sessions at a given time (e.g., can only schedule two per week and can't schedule a next session until the current week's reservations are completed). If scheduled virtual visitation session are not used, the inmate can be further restricted, e.g., allowed to only schedule one or none per week. Such scheduling restrictions and controls prevent one or several inmates from monopolizing the use of the virtual visitation resources.

Schedules can also be used to facilitate the monitoring of inmate virtual visitation activity. In one example, the system is configured to notify investigators and/or officers of upcoming and/or ongoing virtual visitation sessions, so those persons can coordinate monitoring of the sessions in real time, if desired, or review later based on recordings of the sessions. Reports of current/past schedules may be available for inmates/non-inmates on a variety of devices with alerts for everyone interested in the virtual visitation sessions. Similarly, an inmate's attendance in a virtual visitation session can be tracked and used to report deviant behavior, e.g., when an inmate begins skipping counseling or education sessions.

FIG. 1 is a flow chart illustrating an exemplary technique 10 for scheduling inmate visitation sessions. The technique 10 involves receiving a request to schedule a virtual visitation session, as shown in block 2. The request can be received from the inmate or the non-inmate. The technique 10 identifies a shared resource required for the virtual visitation session, as shown in block 4. In one example, the shared resource is a tablet or other computing device shared by multiple inmates. In another example, the shared resource is small room or other relatively-private space within the institution. The technique 10 further involves scheduling a time for the virtual visitation session based on time constraints associated with the shared resource, as shown in block 6, and notifying the inmate and non-inmate of the time scheduled for the virtual visitation session, as shown in block 8.

Scheduling the time for the virtual visitation session is additionally or alternatively based on an inmate time constraint (e.g., the inmate's work schedule) and/or an institution time constraint (the institution's lunch schedule). In another embodiment of the invention, the scheduling is additionally or alternatively based on inmate behavior. For example, inmates recognized for good behavior will have time slots available to them that are not available to inmates recognized for bad behavior. Similarly, in another embodiment of the invention, the scheduling is additionally or alternatively based on an anti-monopolization rule. For example, inmates who have not scheduled a virtual visitation for the last two weeks, are given priority to particular time blocks for scheduling virtual visitations.

Technique 10 additionally tracks subsequent events to determine when a scheduled virtual visitation needs to be cancelled or otherwise changed in one embodiment of the invention. For example, when an inmate receives a punishment that will prevent a virtual visitation from occurring (e.g., time in isolation, phone restrictions, etc.), the virtual visitation schedule is changed and the non-inmate is notified.

B. Identity Authentication

Identity authentication for scheduling and conducting virtual visitation sessions uses appropriate credentials and other proofs of identity. An exemplary system will require unique passwords, use biometric authentication, use one-time credentials generated by a fob, or require multiple layers of identity authentication (e.g., requiring both a password and a fob-generated unique token be provided). Identity authentication can additionally or alternatively involve confirming that the device being used is registered to the right person and/or that the device is geographically located in a location at which the person is expected, e.g., at the person's house.

Figure 2A:
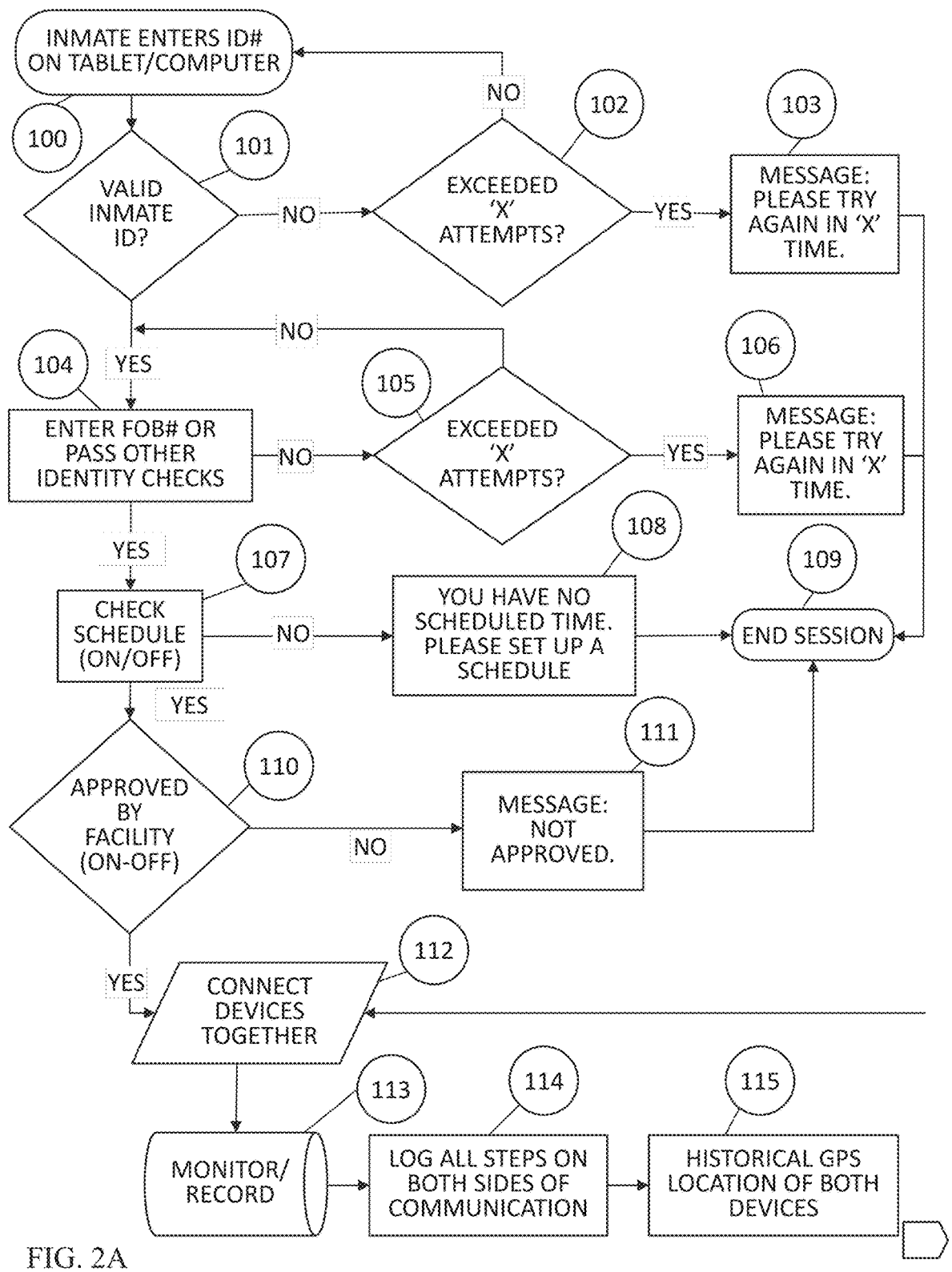
FIGS. 2*a* and 2*b* are flow charts illustrating an example technique for authenticating an inmate and non-inmate prior to allowing a secure, controlled, interactive virtual visitation session.
Figure 2B:
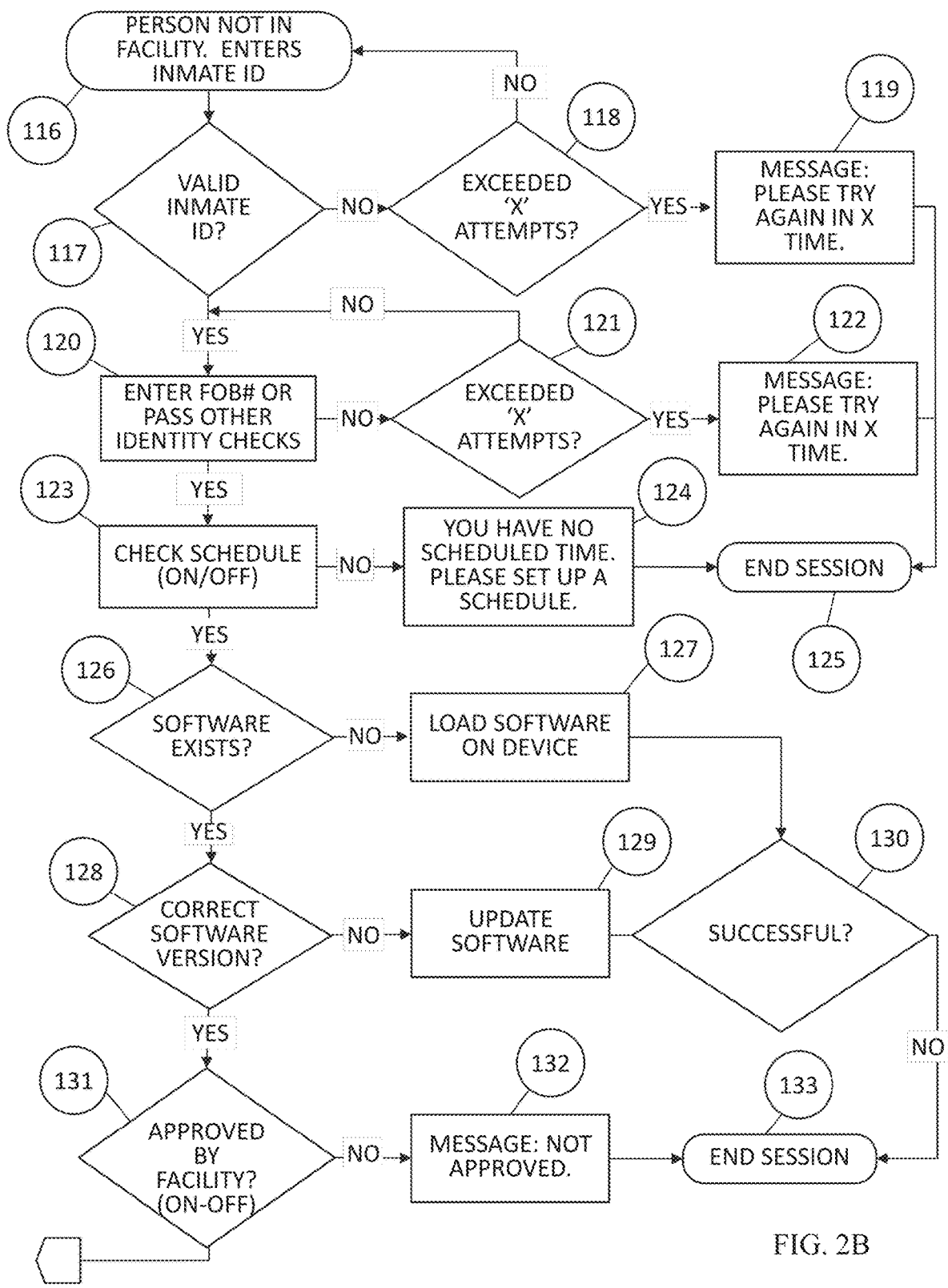

FIGS. 2a and 2b illustrate an exemplary process of authenticating the inmate and non-inmate prior to allowing a secure, controlled, interactive virtual visitation session. At box 100 the inmate enters his or her Personal Identification Number (PIN) or some other identification number as assigned by the confinement institution. At box 101 the identification number is validated. Upon successful verification, the inmate is prompted to enter his or her credentials generated by a fob or some other method of identity check, such as fingerprint, iris scan, voice biometrics, etcetera at box 104. A "fob" is a device (or software application) used to generate an access code for security purposes. An example of a fob is a small hardware device that displays a randomly generated access code, which changes, periodically every 30 to 60 seconds.

If at box 101 the identification fails validation, the system checks to see how many attempts have been made at 102, and if a predefined "X" threshold has not been exceeded, the inmate is routed back to box 100 to begin the process over. If the predefined threshold of attempts has been exceeded at box 102, then the inmate is presented with a message to try again in "X" amount of time at box 103, and the session is terminated at box 109. If at box 104 the secondary form of identification is validated, the system moves to box 107 where schedules are checked to see if a prearranged schedule for virtual visitation exists (if schedules are being used in the implementation).

If the option for schedules is not turned "on," then a meeting could start immediately if approved by the facility. If no approvals are necessary, then the devices may be immediately connected. Approvals require time by someone at the facility. If security is low, or the facility cannot spare the resources to do approvals, the facility may elect to allow virtual visitations without case-by-case approvals.

If at box 104 the secondary form of identification fails validation, at box 105 the number of validation attempts is compared to a threshold. If the threshold has not been exceeded, the inmate is routed back to box 104 to provide his or her secondary form of identification again. If at box 105 the secondary verification fails, the system moves to box 106 with a message to try again in "X" time and ends the session at box 109. At box 107 the system checks to see if the schedule option is turned "on." If a schedule option is "on" and a schedule exists, the system checks to ensure the virtual visitation is approved by the facility at box 110. Thus, if approvals are required and the option for approvals is turned "on", then the system connects the devices together at box 112. If at box 107 a prearranged schedule does not exist, and the option for requiring schedules is turned "on," the inmate will receive a message that he or she needs to schedule a time at box 108, and the session is ended at box 109. If at box 110 the visitation is not approved by the facility (if the option for approvals is turned "on"), the inmate receives a message at box 111, and the session is terminated at box 109.

At box 116 the party outside of the confinement institution enters the Personal Identification Number (PIN) or other identification number of the inmate with which he or she wishes to initiate a virtual visitation. At box 117 the identification is validated. If validation is unsuccessful a threshold is validated at box 118, and if not exceeded the non-inmate is routed back to box 116 to restart the process. If at box 118 the threshold has been exceeded, the non-inmate is given a failure message at box 119, and the session is terminated at box 125. If at box 117 the validation is successful, the non-inmate is given the opportunity to enter their credentials generated by a fob or some other method of identity check, such as fingerprint, iris scan, voice biometrics, etcetera at box 120. If the secondary credentials are unsuccessful at box 121, the number of attempts is compared against a threshold at box 121. If the threshold has not been exceeded the non-inmate is taken back to 120 for another attempt. However, if at box 121 the threshold has been exceeded the non-inmate is given a failure message at box 122, and the session is terminated at box 125.

If at box 120 the secondary identification is successfully validated, the system checks to see if a virtual visitation schedule exists at box 123 (if the option for requiring schedules is turned "on"). If no scheduled exists and schedules are required, the non-inmate is given a message at box 124, and the session is terminated at box 125. If no schedules are required, then the system will proceed to box 126. If at box 123 the schedule does exist, the system will check to see if the correct software is installed at box 126. If the correct software does not exist, it is installed at box 127 and verified at box 130. If the verification is unsuccessful the session is terminated at box 133. If the software does exist at box 126, the version is compared at box 128. If the version is out of date at box 129, the updated version is installed and validated at box 130. If the system is unable to validate the software at box 130, the session is terminated at box 133. If software verification is successful at box 130, the system checks to ensure the virtual visitation has been approved by the facility at box 131 (if the option for approvals is turned "on" in box 131). If approvals are not required, the devices are connected together. If the session has not been approved, or the option for approvals is turned "on" to be approved by the facility, a message is provided at box 132, and the session is terminated at box 133. If the session has been approved at box 131 (if the option is turned "on"), the non-inmate is connected with the inmate at box 112.

Upon successful connection of the inmate and non-inmate at box 112, the system records the visitation session at box 113, logging all sides of the communication at box 114 and monitoring/logging the GPS location of the devices at box 115.

C. Monitoring

Virtual visitation sessions are controlled by monitoring the interactions and communications during the virtual visitation session to detect prohibited activities. In one example, this involves installing specialized software functionality on one or both of the devices to track input on one or both of the devices such as keystrokes on a keyboard, touch input gestures, and use of microphones, cameras and other types of recording devices connected to the computing device used to provide the virtual visitation. In another example, controlling the virtual visitation involves monitoring the applications running on one or both of the devices to ensure that prohibited applications are not running. Installing the virtual visitation session application on the devices may require that the user authorize the application to monitor input, access operating system information, and otherwise obtain authorization and capability to monitor and control the other applications that are used during the virtual visitation and control how those applications are used. For example, the software functionality may identify use of e-mail applications, web browsing applications, and screen sharing applications during a virtual visitation and disconnect the virtual visitation when such applications use is initiated or is otherwise detected.

In another embodiment, the virtual visitation is controlled and/or monitored by using dedicated devices and/or a dedicated communication network. In one example, both parties are able to access applications and/or an interface that is shared from a network server. The inmate and outside party both access the server-provided content at the same time and can see changes that the other party makes. For example, if the server provides a view of a document, each party is able to see the document as well as a cursor of the other party. For example, a son may upload a book report to the server and then both the father (inmate) and son (non-inmate), may access the server to use a word processing application provided by the server to view and/or edit the book report together. One or both parties are able to modify the document and both parties see the changed document. The server content can be accessed by one or both of the parties using both general purpose and dedicated devices. For example, the inmate may use a dedicated computer to access a webpage, authenticate using a fob or other authentication device provided to the inmate, and then view a website interface for the server-provided content. The device may require that the parties authenticate, e.g., using a fob or other authentication device, to ensure the identities of the parties are known and to permit, restrict, control, monitor, and/or track the content provided by the server accordingly. Alternatively, the inmate or outside party may use a dedicated device, designed for limited functions including accessing the server content. Other embodiments involve sharing content between the devices of the parties. In such cases, virtual visitation control and monitoring involves providing the inmate and non-inmate with access to a dedicated tablet device that has limited capabilities or restricting the use of applications on a general purpose device. The applications on both the dedicated and general purpose computing device may be restricted, fixed, or otherwise controlled in various ways. For example, the inmate may purchase a tablet computing device that does not have web-browsing, texting, or VOIP applications or capabilities. Additionally, or alternatively, the tablet may be configured to only allow access to other devices through a dedicated network and thus may be unable to access world wide web addresses on the Internet. The tablet may be configured so that its capabilities cannot be extended, i.e., new applications and network connections cannot be added. The inmate may be required to use a fob to access the limited functionality of the dedicated computing device and/or the dedicated network.

The person with whom the inmate is to interact in the virtual visitation session may be given access though a general purpose computing device or through a dedicated mobile phone, tablet, or other computing device with limited capabilities and/or that only has access to a dedicated network. In the case of a non-inmate using a general purpose device to access a virtual visitation session, access to a private network over which the session is provided may require authenticating using a fob provided to the outside person. This ensures the identity of the non-inmate. In addition, the access can be provided through an application that bases permissions, restrictions, controls, monitoring, and tracking on the identities of the participants as verified based on the authentication. In one embodiment, if a program is access using a fob for authentication on the outside or by the inmate, a program is loaded on the respective non-inmate or inmate device that would keep all parties in the session and would prevent any party from using other applications, network locations, and other restriction functionality until the session is completed.

With respect to dedicated devices, the non-inmates may purchase or rent such a device, or may go to a public or commercial location to access the dedicated device and/or dedicated network. Such a location may be separate from the institution so that the person is able to participate in the virtual visitation without having to actually visit the institution. This is particularly beneficial in circumstances in which the institution is far from the person or otherwise inconvenient to visit. As with the inmate's device, the non-inmate's dedicated device may also be configured to only use certain applications and/or only allow access to certain other devices or using a certain dedicated network, and the non-inmate may be required to use a fob to use the device and/or network.

Using dedicated devices and/or a dedicated network can allow the institution to ensure that the inmate's activities during in a virtual visitation session do not violate the institution's restrictions. The devices and network can be tightly controlled so that use of prohibited applications and access to prohibited systems is not possible using the devices and/or network.

Whether using general purpose or dedicated devices it may alternatively or additionally be desirable to record and/or monitor some of the interactive session. In one embodiment, this involves capturing and analyzing the shared electronic content or a portion of the shared electronic content. For example, a monitoring application may periodically (e.g., once per minute, once every five minutes, etc.) capture the image on the inmate's device's screen and use text recognition to identify inappropriate applications, communications, or network access. In another embodiment, the interactive session may have a slow share rate to facilitate content analysis to detect inappropriate content. For example, the interactive session may only share content between the device screens once every minute, two minutes, etc., so that a monitoring application can process the content to detect impropriety in between these shares.

By providing a secure, controlled virtual visitation with confinement institution inmates, the techniques herein allow inmates to interact with persons outside the institution in new and positive ways. For example, an inmate may use a virtual visitation session to simultaneously view and work on a word processing document or spreadsheet in which the inmate's child is completing homework. The virtual visitation may provide voice communication so that the inmate can talk with the child through the homework assignment and interactively help the child with homework in the word processing document or spreadsheet. An identity authentication technique is used to confirm the identity of the child and a monitoring and control technique is used to ensure that a prohibited activity does not occur during the session.

As other examples, the inmate and a spouse, child, loved one, or friend may play an interactive game together, write a paper or read a book together, work on a legal appeal together, participate in interactive, computer-assisted devotional studies or other learning activities together.

In one example, the inmate uses a fob to authenticate the inmate's identity to gain access to a video game on a tablet. The inmate next goes on-line to send an invite to a non-inmate to join the game. The non-inmate (e.g., a son or daughter at home) goes on-line with computer or tablet and sees invite, then enters code from the non-inmate's fob to join game. Function can also be set up for other group sessions that allows inmate to stay in contact with friends and family members.

In another example, the inmate uses a virtual visitation session to participate in an interactive, computer-assisted learning experience. For example, the inmate can join a school that offers online lectures and be able to see presentations, hear audio, and otherwise participate in a limited, controlled way in the lecture. The inmate's participation may be more limited than other non-inmate lecture attendees. For example, the inmate may be prohibited from posting comments that all attendees will see and may be limited to posting only to the lecturer or a particular subset of attendees. The inmate's audio may similarly be inactive or restricted.

In another example, an inmate uses a virtual visitation session to perform tasks as an employee of an external business. For example, the inmate may be an accountant and use the virtual visitation session to perform tax form preparation interactively. Such a session may be monitored and controlled to ensure that the inmate does not conduct prohibited activities.

In another example, a visitation session can be used to allow the inmate to collaborate on a software application to help family and other non-inmates at home with day-to-day finance, bill pay and other organization tasks that may have previously been performed by the inmate prior to incarceration. The inmate may have previously taken care of paying the bills using a bill pay application and may use the virtual session to help show family members at home how to take over on the bill paying tasks.

In another example, the virtual visitation session is used to allow an inmate to perform community service or fulfill other obligations that require the inmate to interact with non-inmates through collaborative software. The use of a virtual session allows the inmate to perform such services without having personal contact with the non-inmates. This may be desirable if it is desirable to shield the non-inmates from direct personal contact for safety, health, or convenience reasons.

In another example, portable electronic devices and virtual visitation can be used to facilitate inmates re-entering society. It is challenging for counselors to stay in touch with inmates after the inmate leaves the confinement facility. For example, an inmate may use a tablet while in the confinement institution to perform virtual visitation and various other functions. The tablet is configured with software that facilities functions that are appropriate for the inmate while in the institution. After release from the institution, some or all restrictions on the device may be removed, while allowing use of the virtual communication sessions to continue. For example, if the inmate used the tablet to have virtual counseling sessions with a counselor while within the institution, the inmate may continue to use the tablet to conduct virtual visitation sessions with the counselor after release. The software may be configured to allow either the counselor or inmate to reach one another easily and with little effort. The tablet may have tracking capabilities so that the counselor can identify where the inmate's tablet is located. In one example, a counselor works with an inmate to assist with re-entry by helping the inmate obtain a GED, sign up for funded classes at community college, and participate in anger management classes. The tablet provides a tool for the inmate to have a virtual meeting with his counselor and discuss the inmates' progress on courses, etc. To enhance security, the counselor and the inmate could each use a fob to access the information and/or use the virtual visitation features. The ability to conduct virtual visitations can greatly extend the influence and capabilities of counselors, who are typically working with multiple inmates in different locations. The same concept would apply to Chaplains who are working with inmates on the inside and families on the outside to assist the inmate with re-entry.

Additional features assist counselors, medics, and other in-prison personnel who meet with inmates. Such support people use electronic devices to conduct virtual visitation sessions. In one example, a support person uses a device to conduct a virtual visitation session with an inmate using another device, where both are located within a single large, facility. Both parties may be required to authenticate, e.g., with a respective fob. Based on the fob authentication, the virtual visitation is permitted, controlled, restricted, monitored, and/or tracked. This provides numerous efficiencies and advantages. For example, this can save counselors considerable time especially in circumstances in which a counselor must otherwise travel to visit a number of inmates in different buildings, floors, etc.

Virtual visitation sessions can track whether inmates are performing required activities and whether support persons are adequately providing support services. For example, the system can track counselor virtual visitations to determine how many hours are actually dedicated to counselling by a counsel. In another example, the system can determine how many hours an inmate dedicated to counselling, obtaining a GED, etc. All of this tracking can be confirmed using specific authentication to verify that the party completing the required activity or support service is correct. Such information can be used to facilitate good behavior reports, parole decisions, employment decisions, etc. Similarly, trade specific class attendance (e.g., plumbing, carpentry, etc.) can be tracked to demonstrate that an inmate is adequately trained. Conversely, reports could be generated to show that an inmate has been doing nothing, and the reports will give the counselor guidance on what areas need more attention.

Another aspect of the invention provides features that responds to detection of prohibited activities during an interactive visitation session in a way that allows the session to be continued if the prohibited activity ends without allowing the inmate access to the prohibited activity content. For example, when a launch of a prohibited application is detected on a non-inmate device, the visitation can be paused, the inmate's screen blacked out and audio communication turned off, and messages presented to either or both the inmate and non-inmate. For example, the non-inmate may receive a message that reads "Use of application XYZ is not allowed during participation in inmate visitation session. Please discontinue use of application XYZ to resume the inmate visitation session." The inmate may be presented with a message to wait for the visitation session to resume. Blocking content on the inmate-side as opposed to the non-inmate's side of the communication can provide certain advantages. In some implementations, it allows the functionality installed on the non-inmate's device to be less intrusive and less likely to be blocked by a virus scanner or the like.

Figure 3:
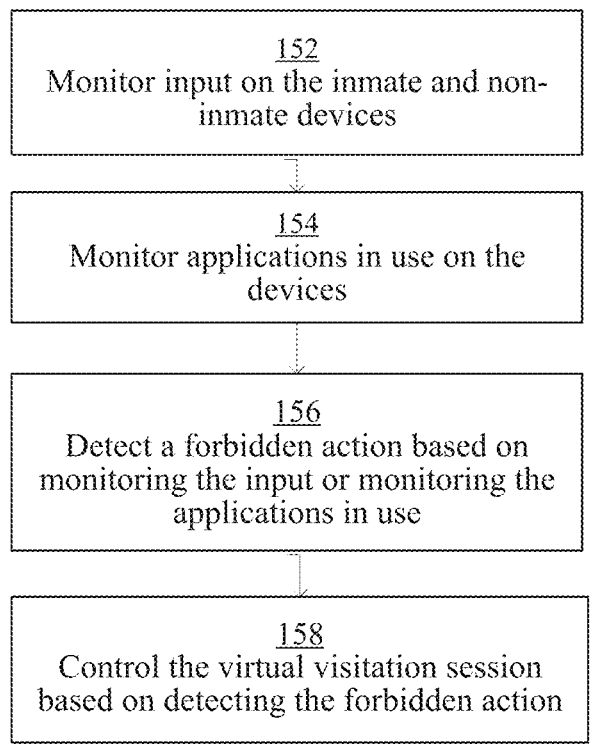
FIG. 3 is a flow chart illustrating an example technique for monitoring a virtual visitation session.

FIG. 3 illustrates an exemplary technique 150 for monitoring a virtual visitation session. The technique 150 involves monitoring input on the inmate's device and/or the non-inmate's device, as shown in block 152. The monitoring occurs during a virtual visitation session in which the inmate and non-inmate interact with an interface that is viewable on the device of the inmate and the device of the non-inmate. In one example, the non-inmate is able to share his or her screen or part of his or her screen with the inmate's device. In another example, content from a particular application is shared between the devices. In another example, a separate server includes the content that is shared with the inmate's device and the non-inmate's device. In one example, monitoring input involves monitoring keystrokes, monitoring touch input, monitoring a microphone, monitoring a camera, and/or monitoring a recording device. Software installed on the inmate's device, non-inmate's device, or intermediary servers can be used to monitor the input.

The technique 150 additionally involves monitoring applications in use on the devices, as shown in block 154. This monitoring also occurs during the virtual visitation session in which the inmate and non-inmate interact with an interface that is viewable on the device of the inmate and the device of the non-inmate. The monitoring, in one example, detects use of an e-mail application, a web browsing application, and/or a screen sharing application on the device of the non-inmate during the virtual visitation session. Software installed on the inmate's device, non-inmate's device, or intermediary servers can be used to monitor the use of applications on the devices.

The technique 150 further involves detecting a forbidden action based on monitoring the input or monitoring the applications in use, as shown in block 156. In one embodiment of the invention, the forbidden actions are specified by the institution. For example, an institution will specify a list of forbidden applications. In another example, the forbidden actions are inmate specific. For example, one inmate will be allowed to use a banking application and another inmate will be forbidden from using the banking application during the virtual visitation sessions.

The technique 150 also involves controlling the virtual visitation session based on detecting the forbidden action. In one example, controlling the virtual visitation session based on detecting the forbidden action involves preventing the display of content associated with the forbidden action on the device of the inmate (for example by blanking out the inmate's screen) and presenting a message regarding the forbidden action on the device of the inmate and/or the device of the non-inmate. Controlling the virtual visitation session, in one embodiment of the invention, involves capturing an image of the interface that is viewable on the device of the inmate and the device of the non-inmate and providing the image for review by a representative of the institution or law enforcement.

The monitoring of input and use of applications on the non-inmate device is based on express permission from the non-inmate in one embodiment of the invention. For example, prior to the initiation of the virtual visitation session, a popup window is used to request and receive permission from the non-inmate to monitor input and use of applications on the device of the non-inmate during the virtual visitation session.

The virtual visitations session is provided conditionally on the successful authentication of the inmate and/or non-inmate in one embodiment of the invention. In one example, authenticating the inmate involves receiving a code generated by a fob of the inmate or biometric identity information of the inmate and authenticating the non-inmate involves receiving a code generated by a fob of the non-inmate or biometric identity information of the non-inmate.

The communications and shared content of a virtual visitation session is recorded in one embodiment of the invention. Such recordings can be provided to a representative of the institution or law enforcement during and/or after the session. In one example, this involves periodically recording an image of the interface that is viewable on the first device of the inmate and the second device of the non-inmate. For example, an image can be captured every 5, 10, 20, 30, or 45 seconds, or every minute, 2 minutes, etc. Detection of suspicious activity can increase the frequency of recording images of the content of the virtual visitation session.

Figure 4:
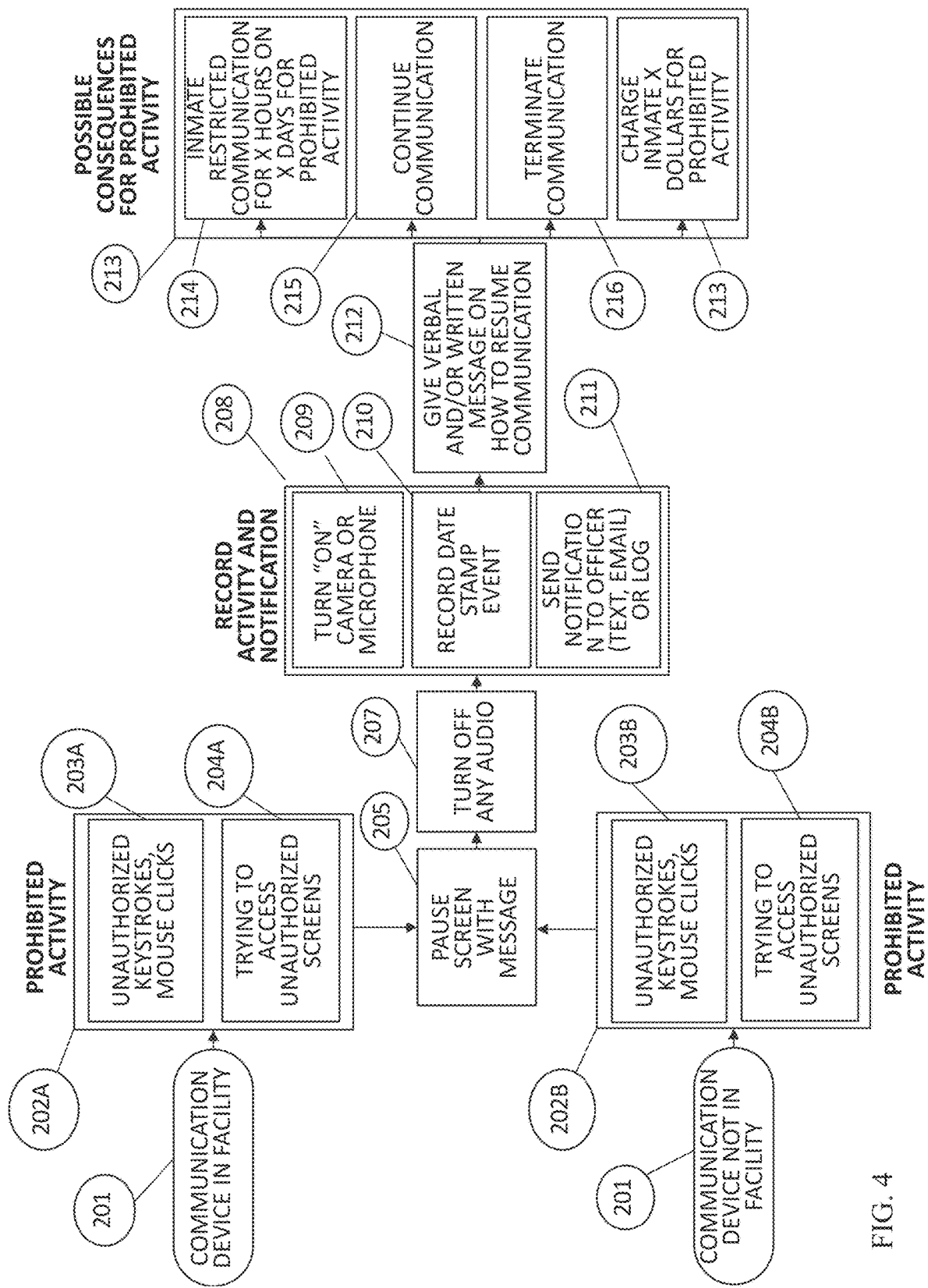
FIG. 4 is a flow chart illustrating an example technique for detecting prohibited activity during a virtual visitation session.

FIG. 4 illustrates an exemplary process of detecting a prohibited activity and how it is handled. At box 201 the inmate is using the device to access an application. The system recognizes this at box 202A as a prohibited activity, and the system looks at box 203A to further identify it as a unauthorized keystroke, mouse click, or possibly someone trying to get into a unauthorized screen (box 204A). Once the determined prohibited activity is identified, it is passed to box 205, and the user is given some kind of message. Then box 207 will turn off any audio and pass everything for a record activity or notification in box 208. At this point several things can happen: box 209 can turn "on" a camera or microphone to gather more, box 210 can record the information, and/or box 211 can send a notification to someone in one or more a variety of communication mediums (e-mail, text, call, etc.) or just log the event. After the recording and Notification is complete, at box 212 a message in the form of verbal and/or written response will be given to the user on how to resume communications (if allowed). Possible consequences for prohibited activity box 213 are: box 214 by restricting the inmate's communication for a set time, box 215 allowing the communication, box 216 termination of the access, or box 213 charging the inmate x dollars for the prohibited activity.

Box 206 illustrates the same type of prohibited activity perpetrated by a non-inmate with the same effect. When the system recognizes the prohibited activity on the non-inmate side (box 202B), it will pass to box 203B and detect if it is an unauthorized keystroke, mouse click or box 204B some kind of unauthorized screen. This is passed to box 205 that will pause the screen with some kind of message. Then box 207 will turn off the audio and pass to box 208 for a record activity or notification. The camera or microphone may be turned "on" in box 209 for investigative tools, and this may include both communication devices. Then box 210 will record a date stamp of the event, and/or at box 211 a notification will be given to officer in the form of text, email, or just logged in the system. Once everything is determined, a verbal and or written message may be given to one/or both of the communication devices on how to resume communications. At box 213 the non-inmate may be given consequences for the prohibited activity. Hours and/or days of communication may be restricted (box 214), the system may allow them to continue the communication (box 215), the communication may be terminated at that point (box 216), and/or the inmate could be charged x dollars for what the non-inmate was doing (box 213).

Various techniques can be used to facilitate payment of a visitation session. In some circumstances, the inmate or non-inmate involved in the visitation session may pay for the call directly. The inmates mother, for example, may have an account for paying for telephone calls from the inmate and may be willing to apply funds from that account to pay for visitation sessions. Sponsors and advertisers can alternatively pay for (or contribute to paying for) a visitation session. For example, a group of bailbondsman or a charitable organization may contribute money to facilitate such contact between inmates and their children. In another circumstance, a visitation session is partially or entirely paid for through advertising. Graphic, video, and/or audio advertisements may be presented during the visitation session. In one embodiment, the advertisement is presented simultaneously with the visitation session. In another embodiment, the advertisement must be viewed before the visitation session starts. In another embodiment, the visitation session is paused at predefined points or intervals to present an advertisement.

In some implementations, a virtual visitation session involving an inmate of a controlled-access residential institution and a non-inmate on separate devices is provided using a method that controls the virtual visitation session. The virtual visitation session may be provided by a processor executing instructions to perform the method. For example, the method may share audio and video between the inmate and the non-inmate in the virtual visitation session. The method may include sharing a video or image of the inmate with the non-inmate and a video or image of the non-inmate with the inmate in the virtual visitation session.

The method monitors the virtual visitation session for prohibited activities. The method may, based on detecting at least one of the prohibited activities, control the virtual visitation session to discourage, record, or prevent additional occurrences of the prohibited activities.

Controlling the virtual visitation session may involve pausing the sharing of video of the virtual visitation session and presenting a message regarding the at least one of the prohibited activities on at least one of the separate devices. The message may be provided to the inmate, the non-inmate, or both. The message may require discontinuing at least one of the prohibited activities to resume the sharing of video of the virtual visitation session. In some implementations, the sharing of the audio continues while the sharing of video is paused. In some implementations, the audio is recorded while the sharing of the video is paused.

Controlling the virtual visitation session may involve preventing display of content associated with at least one of the prohibited activities on a device used by the inmate. In some implementations, controlling the virtual visitation session involves discouraging, preventing, or recording the inmate: making a threat to a law enforcement officer, a judge, or another individual; contacting a victim of a crime committed by the inmate; plotting revenge against a law enforcement officer, a judge, or other individual; planning an escape; or planning an illegal activity. In some implementations, controlling the virtual visitation session involves tracking keystrokes, touch input gestures, use of a microphone, use of a camera, or use of a recording device. In some implementations, controlling the virtual visitation session involves monitoring for use of e-mail applications, web browsing applications, and screen sharing applications.

In some implementations, a virtual visitation session involving an inmate of a controlled-access residential institution and a non-inmate on separate devices is provided using a method that controls the virtual visitation session. The virtual visitation session may be provided by a processor executing instructions to perform the method. For example, the method may share audio and video between the inmate and the non-inmate in the virtual visitation session and monitor the virtual visitation session for prohibited activities. Based on detecting at least one of the prohibited activities, the method may generate a flag identifying a starting time of a time segment during which the at least one of the prohibited activities occurred during the virtual visitation session, notify an authority of the at least one of the prohibited activities having occurred during the virtual visitation session, and/or provide direct access to the authority to a portion of a recording of the virtual visitation session based on the flag.

The direct access may be provided to the authority while the virtual visitation session is ongoing. The direct access may include a playback of the portion of the recording with an indicator added to identify an area within a recorded image associated with the at least one of the prohibited activities. The direct access may include a playback of the portion of the recording with an indicator added to identify a word, phrase, sentence, or group of sentences within recorded audio content associated with the at least one of the prohibited activities. The direct access may include a playback of the portion of the recording with a transcription of words spoken during the portion of the recording, where the transcription includes an indicator identifying a word, phrase, sentence, or group of sentences associated with the at least one of the prohibited activities. The direct access direct may include access to a snippet of less than all of a recording of the virtual visitation session to the authority, where the snippet is selected based on the flag.

Detecting the at least one of the prohibited activities may involve monitoring the interactions and communications during the virtual visitation session, tracking input on a keyboard or touch input device, monitoring audio received via a microphone, or monitoring images captured via a camera. Detecting the at least one of the prohibited activities may involve authenticating an identity of the inmate or an identity of the non-inmate during the virtual visitation session.

D. Server-Based Virtual Desktop

Figure 5:
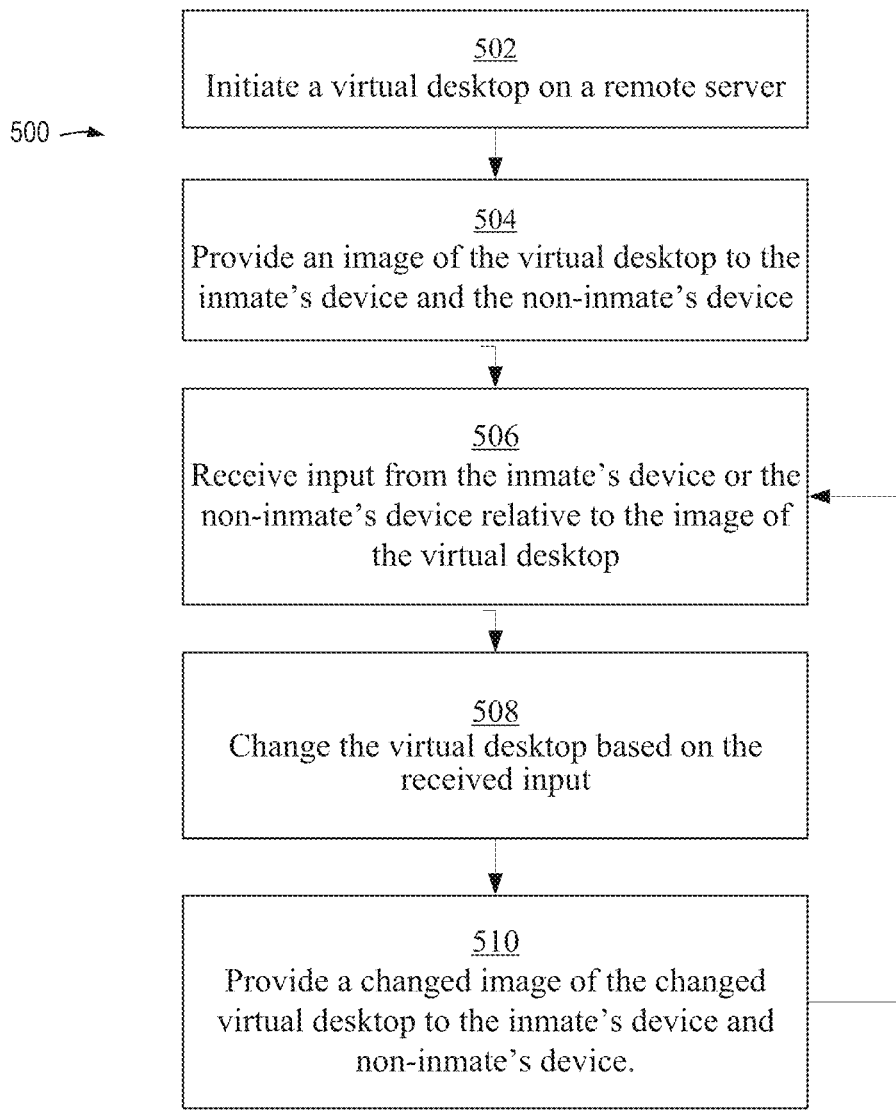
FIG. 5 illustrates an exemplary technique for providing a controlled virtual visitation session using a server-based virtual desktop.

FIG. 5 illustrates an exemplary technique 500 for providing a controlled virtual visitation session using a server-based virtual desktop. The technique 500 involves initiating a virtual desktop on a remote server, as shown in block 502. The server is remote from a device of the inmate and a device of the non-inmate that will participate in the virtual visitation session. In one example, the virtual desktop provides a limited set of applications. This prevents the inmate from using the virtual visitation session to gain access to prohibited applications and content from the non-inmate's device. In one example, the limited set of applications provided on the virtual desktop does not include applications for e-mail or accessing the Internet. The inmate and non-inmate are restricted from adding applications to the virtual desktop in one embodiment of the invention.

The technique 500 further involves providing an image of the virtual desktop to the device of the inmate and the device of the non-inmate, as shown in block 504. The technique 500 further involves providing the virtual visitation session by iteratively: receiving input from the device of the inmate or the device of the non-inmate relative to the image of the virtual desktop, as shown in block 506, changing the virtual desktop based on the received input, as shown in block 508, and providing a changed image of the changed virtual desktop to the first device of the inmate and the second device of the non-inmate, as shown in block 510.

In one embodiment of the invention, the virtual visitation session shares audio between the inmate and non-inmate. The audio can be provided using the server, provided directly between the devices of the inmate and non-inmate, or provided using other appropriate intermediary devices. Similarly, the virtual desktop further provides video conference functionality in one embodiment of the invention by including images or video of the inmate or non-inmate. The video or images can be part of the images of the desktop that are shared from the server in one example.

The virtual desktop can provide applications that allow the inmate and non-inmate to collaborate on work product. In one example, the server's virtual desktop receives an upload of a document from the non-inmate and executes an application on the virtual desktop to display contents of the uploaded document. As a specific example, a non-inmate child uploads a book report document to work on with his father, the inmate, using a document editing application on the virtual desktop. An image of the document editing application displaying the content of the document is shared with both the non-inmate and the inmate. The inmate and non-inmate are then able to use their devices to provide input to edit the remote virtual desktop. The edits are viewable by both the inmate and non-inmate since the virtual desktop is shared with both.

Figure 6:
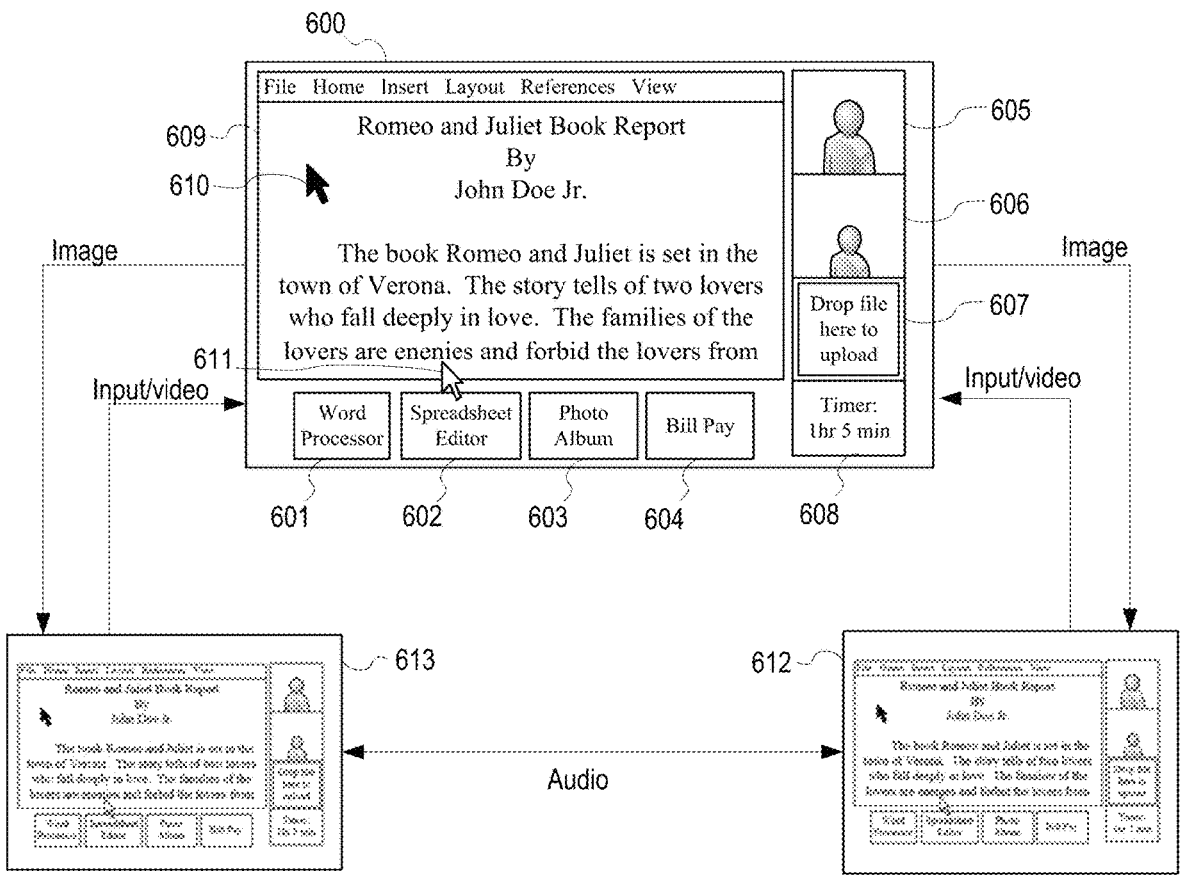
FIG. 6 illustrates an exemplary virtual desktop for a virtual visitation session.

FIG. 6 illustrates an exemplary virtual desktop 600 for a virtual visitation session. In this example, the virtual desktop 600 includes a limited set of applications: a word processor 601, a spreadsheet editor 602, a photo album 603, and a bill pay application 604. The virtual desktop 600 also includes video from the inmate 605 and video from the non-inmate 606, in this example, and thus provides a video conference in addition to shared desktop content. The virtual desktop 600 also includes an upload area 607 with the label "Drop file here to upload." The virtual desktop 600 further includes a timer 608 indicating the length of time the virtual visitation session has progressed. In this example, the virtual desktop 600 shows workspace 609 for the word processor application 601, showing content from a book report that the non-inmate has uploaded. The virtual desktop 600 also displays a cursor 610 controlled by input from the non-inmate device 612 and a cursor 611 controlled by input from the inmate device 613.

FIG. 6 illustrates that the image of the virtual desktop 600 is shared with (and displayed by) both the non-inmate device 612 and the inmate device 613. These device 612, 613 in turn are able to provide input relative to those images. For example, when the inmate moves the cursor on his own device 613, the input is provided to the virtual desktop 600, which moves the displayed cursor 611 accordingly. Mouse clicks, typing, touch input, and other types of input are similarly provided from the devices 612, 613 to allow both the inmate and non-inmate to simultaneously interact with the shared virtual desktop. In this example, audio is also shared between the device 612, 613. Thus, in the example, the inmate and non-inmate are able to talk with one another, see images of one another, and interact simultaneously with shared content on the virtual desktop 600. Other embodiments, will not include video and/or audio and/or will share the virtual interface using content rather than images.

Significantly, the inmate only has access to the content from the virtual desktop 600 and is unable to access applications (e-mail, Internet browsers, etc.) that are on the non-inmate device 612. The inmate and non-inmate cannot expand the functionality of the virtual desktop by adding applications and prohibited content items. The virtual desktop thus effectively and securely restricts the inmate's access to only the limited set of applications that are provided on the virtual desktop 600. In the particular example of FIG. 6, the inmate is able to view the book report uploaded by the non-inmate using one of the allowed applications (i.e., the word processor 601), positions his cursor next to the misspelled word "enenies" and tells his son "it looks like you misspelled enemies here, you need to change the second n to an m." The son hears the audio from the inmate and sees the inmate's cursor 611 below the "n" and then makes the change by typing. The typing input is sent to the server and changes the document on virtual desktop 600. The non-inmate can later download the edited document from the virtual desktop 600.

These example uses of a virtual desktop 600 are provided merely to illustrate general principles. Numerous other uses are contemplated. For example, in another example, the inmate and non-inmate (spouse) upload and work on a spreadsheet showing the family finances. In another example, the inmate and non-inmate (counselor) upload and work on a counseling worksheet. In another example, the inmate and non-inmate (attorney) upload and review an appeal brief together. In another example, a non-inmate (family member or counselor) uploads a photo album to share memories with the inmate. Numerous other use cases are possible.

E. Exemplary System

Figure 7:
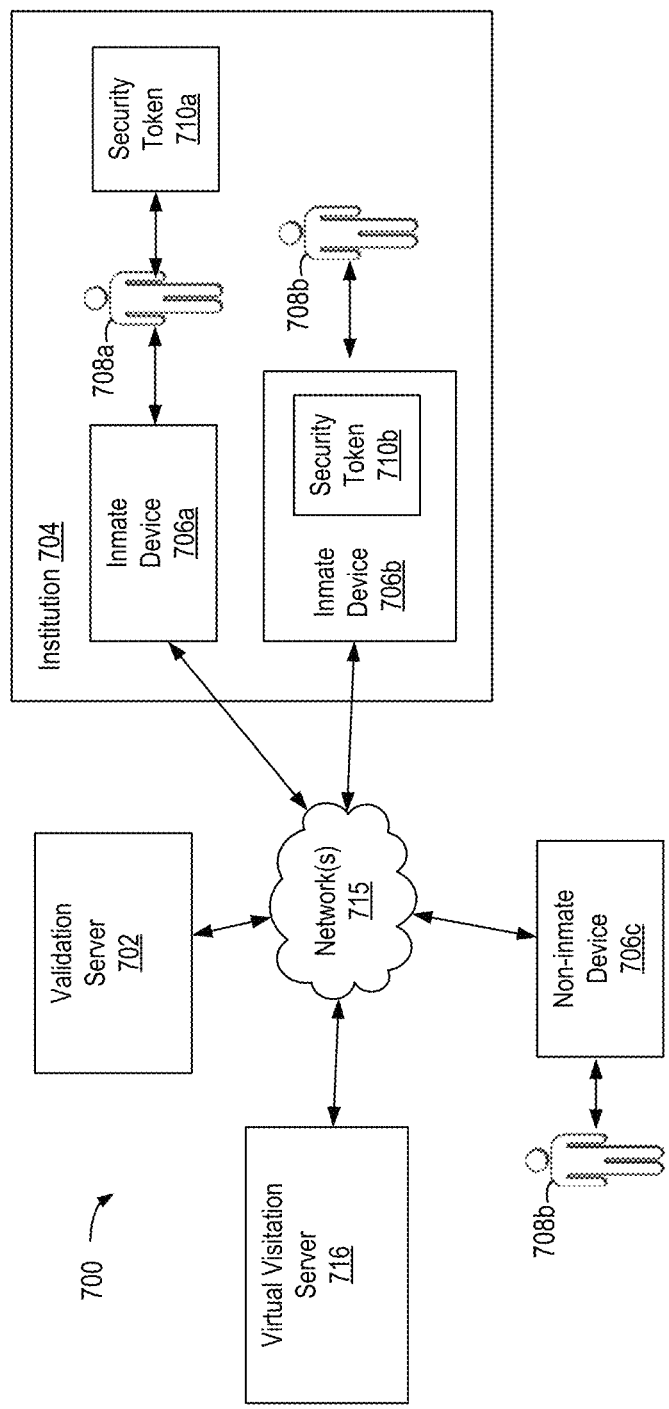
FIG. 7 is a block diagram depicting an example of a system for providing virtual visitation services to inmates of a controlled access residential institution.

FIG. 7 is a block diagram depicting an example of a system 700 for providing services to inmates using portable electronic devices in an institution. In one embodiment a validation server 702 is used to validate a security code used by individuals 708*a*, 708*b* to use inmate devices 706*a*, 706*b* within institution 704 and personal device 706*c* outside of the institution 704 to conduct virtual visitation sessions. Specifically, the validation server 702, in this example, requires that entry or provision of a security code before permitting a virtual visitation session. In this example, individual 708*a* is an inmate of the institution who uses a security token 710*a* provided in a separate device to generate a security code that is entered into or provided to device 706*a*. The virtual visitation session from the inmate device 706*a* is partially or entirely restricted until the validation server 702 validates the security code. Individual 708*b* is an inmate of the institution who uses a security token 710*a* provided by an application on the inmate device 706*b* to generate a security code that is entered into or provided to device 706*b*. In one example, the individual 708*b* uses biometric information, such as a fingerprint scan, to obtain the security code.

Each of security tokens 710*a* and 710*b* is accessible only to the individual who has been authorized to access the respective device. Specifically, security token 710*a* is a device that individual 708 wears or otherwise maintains control over so that other individuals do not have access to it. If the security token 710*a* is lost or stolen, it can be quickly reported so that security codes generated by the security token 710*a* no longer work. Security token 710*b* is only accessible using biometric information so that other individuals cannot obtain the required security codes. The security codes can change over time (e.g., 1 time use codes, codes that change periodically, etc.). A virtual visitation session can periodically require that a fresh security code be provided to ensure that the appropriate person is still participating the virtual visitation session. In one alternative embodiment, the functionality of validation server 702 is included on each of the inmate devices 706a, 706b and/or on the personal device 706c.

Communications in the system 700 are illustrated as through network(s) 715, however, any appropriate network or communication system may be used. In this example, a virtual visitation server 716 coordinates the virtual visitation session between inmates within the institution 704 and non-inmates, such as non-inmate 708b. For example, the virtual visitation server 716 can provide audio and video conferencing between the participants. The virtual visitation server 716 can also receive content, such as a screen shared from the non-inmate's device 706c, monitor and/or record some or all of the content, and pass the approved content on to the inmate's device 706a, and otherwise control the virtual visitation sessions. In another embodiment of the invention, the virtual visitation server 716 provides a virtual desktop that is shared with both the non-inmate's device 706c and the inmate's device 706a, receives inputs from these devices 706a, 706c, alters the virtual desktop based on the inputs, and shares the updated virtual desktop with the inmate's device 706c and the inmate's device 706a. In another embodiment of the invention, monitoring software is installed on the inmate's device 706c and/or the inmate's device 706a to monitor the virtual visitation sessions that occur between the devices.

The system configuration of FIG. 7 is provided as one example of a system configuration. In a particular implementation, devices can be configured differently depending upon the particular circumstances of the implementation.

Figure 8:
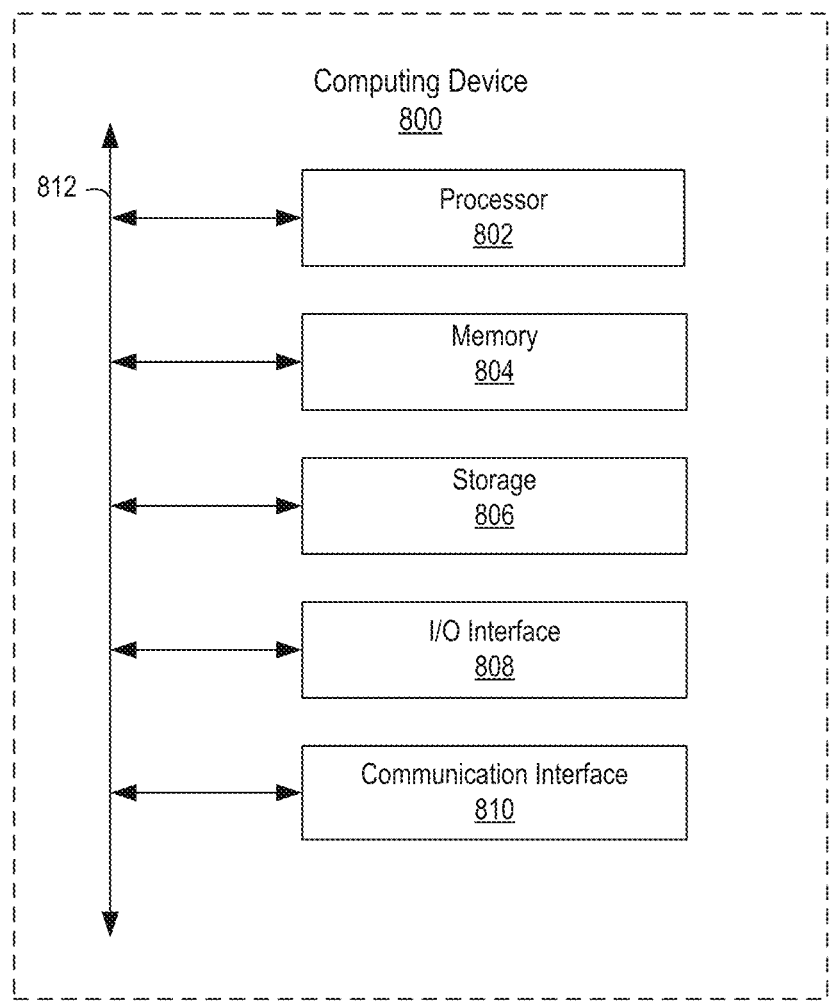
FIG. 8 is a block diagram depicting example hardware implementations for the components described in FIG. 7.

FIG. 8 is a block diagram depicting example hardware implementations for the servers and devices described in FIG. 7. Each such server or device 800 may include a processor 802 that is communicatively coupled to memory 804 and storage 806 and that executes computer-executable program code and/or access information stored in the memory 804 and storage 806. The processor 802 may comprise a microprocessor, an application-specific integrated circuit ("ASIC"), a state machine, or other processing device. The processor 802 can include any of a number of processing devices, including one. Such a processor 802 can include or may be in communication with a computer-readable medium storing instructions that, when executed by the process, cause the processor to perform the operations described herein.

The memory 804 and storage 806 can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, and ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++ C#, Visual Basic, Java, Python, Perl, and JavaScript.

The device 800 may also comprise a number of external or internal devices such as input or output devices. For example, the device 800 may have input/output ("I/O") interface 808 that can receive input from input devices or provide output to output devices. A bus 812 can also be included in the device 800. The bus 812 can communicatively couple one or more components of the server. The server can execute program code that configures the processor to perform one or more of the operations described above with respect to the Figures. The program code may be inmate in the memory or any suitable computer-readable medium and may be executed by the processor or any other suitable processor. In additional or alternative embodiments, program code can be resident in a memory that is accessible via a data network, such as a memory accessible to a cloud service.

The device 800 can also include at least one network interface device or other communication interface 810. The communication interface 810 can include any device or group of devices suitable for establishing a wired or wireless data or telephone connection to one or more networks. Non-limiting examples of a network interface device include an Ethernet network adapter, a modem, and/or the like. A device can transmit messages as electronic or optical signals.

An electronic device can be a computer, telephone, mobile device, tablet, smart phone, smart watch, or any communications device. A communications device can include a processor, memory, a bus, input/output components, network interface components, and other appropriate communication components. Non-limiting examples of input devices include a touch screen (e.g., one or more cameras for imaging a touch area or pressure sensors for detecting pressure change caused by a touch), a mouse, a keyboard, or any other device that can be used to generate input events in response to physical actions by a user of a computing device, or a microphone. Non-limiting examples of output devices include an LCD screen, an external monitor, a speaker, or any other device that can be used to display or otherwise present outputs generated by a computing device. The device can execute program code that configures the processor to perform one or more of the operations described above.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not be described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

The foregoing description and summary of the invention are to be understood as being in every respect illustrative and exemplary, but not restrictive, and the scope of the invention disclosed herein is not to be determined only from the detailed description of illustrative embodiments but according to the full breadth permitted by patent laws. It is to be understood that the embodiments shown and described herein are only illustrative of the principles of the present invention and that various modification may be implemented by those skilled in the art without departing from the scope and spirit of the invention.

What is claimed is:

1. A method of providing a virtual visitation session involving an inmate of a controlled-access residential institution and a non-inmate on separate devices, the method comprising:
   sharing audio and video between the inmate and the non-inmate in the virtual visitation session;
   monitoring the virtual visitation session for prohibited activities; and
   based on detecting at least one of the prohibited activities, controlling the virtual visitation session to discourage, record, or prevent additional occurrences of the prohibited activities, wherein controlling the virtual visitation session comprises pausing the sharing of video of the virtual visitation session and presenting a message regarding the at least one of the prohibited activities on at least one of the separate devices, wherein the message requires discontinuing at least one of the prohibited activities to resume the sharing of video of the virtual visitation session.

2. The method of claim 1 further comprising continuing the sharing of the audio while the sharing of video is paused.

3. The method of claim 2 further comprising recording the audio while the sharing of the video is paused.

4. The method of claim 1, wherein the message is provided to both the inmate and the non-inmate.

5. The method of claim 1, wherein the message is provided to only one of the inmate and the non-inmate.

6. The method of claim 1, wherein controlling the virtual visitation session comprises preventing display of content associated with at least one of the prohibited activities on a device used by the inmate.

7. The method of claim 1 further comprising sharing a video or image of the inmate with the non-inmate and a video or image of the non-inmate with the inmate in the virtual visitation session.

8. The method of claim 1, wherein controlling the virtual visitation session comprises discouraging, preventing, or recording the inmate:
   making a threat to a law enforcement officer, a judge, or another individual;
   contacting a victim of a crime committed by the inmate;
   plotting revenge against a law enforcement officer, a judge, or other individual;
   planning an escape; or
   planning an illegal activity.

9. The method of claim 1, wherein controlling the virtual visitation session comprises tracking keystrokes, touch input gestures, use of a microphone, use of a camera, or use of a recording device.

10. The method of claim 1, wherein controlling the virtual visitation session comprises monitoring for use of e-mail applications, web browsing applications, and screen sharing applications.

11. The method of claim 1, wherein detecting the at least one of the prohibited activities comprises:
   tracking input on a keyboard or touch input device;
   monitoring audio received via a microphone; or
   monitoring images captured via a camera.

* * * * *